United States Patent
Kawano et al.

(10) Patent No.: US 10,154,266 B2
(45) Date of Patent: Dec. 11, 2018

(54) VIDEO QUALITY ESTIMATION DEVICE, VIDEO QUALITY ESTIMATION METHOD, AND VIDEO QUALITY ESTIMATION PROGRAM

(71) Applicant: NIPPON TELEGRAPH AND TELEPHONE CORPORATION, Chiyoda-ku (JP)

(72) Inventors: Taichi Kawano, Musashino (JP); Hiroshi Yamamoto, Musashino (JP); Kei Takeshita, Musashino (JP); Kazumichi Sato, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 15/525,846

(22) PCT Filed: Nov. 16, 2015

(86) PCT No.: PCT/JP2015/082136
§ 371 (c)(1),
(2) Date: May 10, 2017

(87) PCT Pub. No.: WO2016/080354
PCT Pub. Date: May 26, 2016

(65) Prior Publication Data
US 2017/0359582 A1    Dec. 14, 2017

(30) Foreign Application Priority Data
Nov. 17, 2014  (JP) ................................ 2014-232691

(51) Int. Cl.
*H04N 19/149*    (2014.01)
*H04N 19/154*    (2014.01)
(Continued)

(52) U.S. Cl.
CPC ......... *H04N 19/154* (2014.11); *H04N 19/124* (2014.11); *H04N 19/149* (2014.11); *H04N 19/198* (2014.11); *H04N 17/004* (2013.01)

(58) Field of Classification Search
CPC ... H04N 17/004; H04N 19/154; H04N 19/124
(Continued)

(56) References Cited

U.S. PATENT DOCUMENTS

| | | | |
|---|---|---|---|
| 2001/0017887 A1* | 8/2001 | Furukawa | H04N 19/139 375/240.03 |
| 2008/0025400 A1 | 1/2008 | Sugimoto et al. | |

(Continued)

FOREIGN PATENT DOCUMENTS

| | | |
|---|---|---|
| JP | 2007-67626 A | 3/2007 |
| JP | 2008-35357 A | 2/2008 |

(Continued)

OTHER PUBLICATIONS

International Search Report dated Feb. 2, 2016 in PCT/JP2015/082136.
(Continued)

*Primary Examiner* — Emmanuel Bayard
(74) *Attorney, Agent, or Firm* — Oblon, McClelland, Maier & Neustadt, L.L.P.

(57) ABSTRACT

A video quality estimation apparatus used for an encoded video, to estimate a video quality value being a value quantifying a video quality being quality of the video felt by a user when viewing and listening to the video. The apparatus includes a maximum value calculator to calculate a maximum value of the video quality value from a resolution of the video and a frame rate of the video, and a video quality calculator to calculate an estimated video quality value corresponding to an encoding bit rate having been input, based on a predetermined relationship between the encoding
(Continued)

bit rate of the video and the video quality value. The predetermined relationship is a relationship in which the video quality value increases while the encoding bit rate increases, and the video quality value converges on the maximum value calculated by the maximum value calculator.

9 Claims, 3 Drawing Sheets

(51) Int. Cl.
*H04N 19/124* (2014.01)
*H04N 19/196* (2014.01)
*H04N 17/00* (2006.01)

(58) Field of Classification Search
USPC ............................ 375/240.01–240.03, 225
See application file for complete search history.

(56) References Cited

U.S. PATENT DOCUMENTS

| | | | | |
|---|---|---|---|---|
| 2009/0225170 A1* | 9/2009 | Yamagishi | ........... | H04N 17/004 348/192 |
| 2009/0262198 A1* | 10/2009 | Yamagishi | ........... | H04N 17/004 348/180 |
| 2009/0284650 A1* | 11/2009 | Yu | .............. | H04L 12/5602 348/390.1 |
| 2012/0020415 A1* | 1/2012 | Yang | .................... | H04N 17/004 375/240.27 |
| 2012/0206610 A1* | 8/2012 | Wang | .................... | H04N 17/004 348/184 |
| 2015/0181208 A1* | 6/2015 | Park | ................ | H04N 19/00206 375/240.02 |
| 2015/0281288 A1* | 10/2015 | Levinson | ................ | H04L 47/41 709/219 |
| 2017/0188028 A1* | 6/2017 | Park | ..................... | H04N 19/157 |
| 2018/0027239 A1* | 1/2018 | Fremlin | ............... | H04N 19/192 |

FOREIGN PATENT DOCUMENTS

| | | |
|---|---|---|
| JP | 2014-107645 A | 6/2014 |
| WO | WO 2007/129422 A1 | 11/2007 |

OTHER PUBLICATIONS

Motohiro Takagi, et al., "Efect of Spatio-Temporal Resolution on Subjective Quality" The Institute of Image Information and Television Engineers, Aug. 29, 2012, 2 Pages.

Motohiro Takagi, et al., "Optimization of Spatial and Temporal Resolution Based on Subjective Video Quality Estimation" The Transactions of the Institute of Electronics, Information and Communication Engineers, vol. J97-D, No. 9, Sep. 2, 2014 pp. 1374-1384 (with partial English translation).

Yuichiro Urata, et al., "Validity Verification of ITU-T Recommendation P.1201.1 Model Extended for Video Resolution" IEICE Technical Report CQ2012-94, Mar. 2013, pp. 59-63.

* cited by examiner

VIDEO QUALITY ESTIMATION DEVICE, VIDEO QUALITY ESTIMATION METHOD, AND VIDEO QUALITY ESTIMATION PROGRAM

TECHNICAL FIELD

This invention relates to an apparatus, a method, and a program used in a service that provides encoded video to be viewed and listened to, for estimating quality of the video felt by a user when viewing and listening to the video (referred to as the "video quality", below).

BACKGROUND ART

In recent years, video distribution services through networks have become widespread. In order to raise the revenue, it is important for video distribution service providers to provide the services with the video quality that satisfies users. Therefore, it is important to design and manage the services based on the video quality, and this makes a demand for a technology that quantifies the video quality.

Generally, an encoding process is applied to a video to compress the amount of data. If the encoding bit rate is lowered, deformation, fading, and the like are generated in blocks that degrade the video quality. Also, the video quality is also dependent on the resolution and the frame rate of the video.

In order to design and manage the video distribution service, it is necessary to take the above properties of the video quality into account, and to precisely estimate the video quality in terms of the encoding bit rate, the resolution, and the frame rate.

PRIOR ART DOCUMENTS

Non-Patent Documents

Non-patent document 1: Yuichiro Urata, Kazuhisa Yamagishi, "Validity verification of ITU-T Recommendation P.1201.1 Model Extended for Video Resolution", EIC technical report, CQ2012-94, pp.59-63, March 2013

SUMMARY OF INVENTION

Problem to be Solved by the Invention

This invention has been made paying attention to the situation described above, and the object is to provide a technology that makes it possible to precisely estimate the video quality based on the encoding bit rate, the resolution, and the frame rate.

Means for Solving the Problem

According to an embodiment of the present invention, a video quality estimation apparatus is provided that is used for an encoded video to be viewed and listened to, to estimate a video quality value being a value quantifying a video quality being quality of the video felt by a user when viewing and listening to the video. The video quality estimation apparatus includes a maximum value calculator configured to calculate a maximum value of the video quality value from a resolution of the video and a frame rate of the video; and a video quality calculator configured to calculate an estimated video quality value corresponding to an encoding bit rate having been input, based on a predetermined relationship between the encoding bit rate of the video and the video quality value. Here, the predetermined relationship is a relationship in which the video quality value increases while the encoding bit rate increases, and the video quality value converges on the maximum value calculated by the maximum value calculator.

Also, according to another embodiment of the present invention, a video quality estimation apparatus is provided that is used for an encoded video to be viewed and listened to, to estimate a video quality value being a value quantifying a video quality being quality of the video felt by a user when viewing and listening to the video. The video quality estimation apparatus includes a maximum value calculator configured to calculate a maximum value of the video quality value, based on a resolution being a number of pixels in one frame of the video and a frame rate being a number of frames per unit time of the video; an inflection point calculator configured to calculate an inflection point being a point at which a curving direction changes on a curve drawn by a sigmoid function having a property of an S-curve that converges on a certain value when an input value increases or decreases, based on the resolution and the frame rate; and a video quality calculator configured to calculate an estimated video quality value by inputting an encoding bit rate being an average amount of data per unit time of the video, the maximum value of the video quality value calculated by the maximum value calculator, and the inflection point calculated by the inflection point calculator, into the sigmoid function.

Also, according to another embodiment of the present invention, a method for estimating video quality is provided that is executed by a video quality estimation apparatus used for an encoded video to be viewed and listened to, to estimate a video quality value being a value quantifying a video quality being quality of the video felt by a user when viewing and listening to the video. The method includes a maximum value calculating step for calculating a maximum value of the video quality value from a resolution of the video and a frame rate of the video; and a video quality calculating step for calculating an estimated video quality value corresponding to an encoding bit rate having been input, based on a predetermined relationship between the encoding bit rate of the video and the video quality value. Here, the predetermined relationship is a relationship in which the video quality value increases while the encoding bit rate increases, and the video quality value converges on the maximum value calculated by the maximum value calculating step.

Also, according to another embodiment of the present invention, a method for estimating video quality is provided that is executed by a video quality estimation apparatus used for an encoded video to be viewed and listened to, to estimate a video quality value being a value quantifying a video quality being quality of the video felt by a user when viewing and listening to the video. The method includes calculating a maximum value of the video quality value, based on a resolution being a number of pixels in one frame of the video and a frame rate being a number of frames per unit time of the video; calculating an inflection point being a point at which a curving direction changes on a curve drawn by a sigmoid function having a property of an S-curve that converges on a certain value when an input value increases or decreases, based on the resolution and the frame rate; and calculating an estimated video quality value by inputting an encoding bit rate being an average amount of data per unit time of the video, the maximum value, and the inflection point, into the sigmoid function.

Advantage of the Invention

According to an embodiment of the present invention, a technology is provided that makes it possible to precisely estimate the video quality based on the encoding bit rate, the resolution, and the frame rate.

EMBODIMENTS OF THE INVENTION

In the following, embodiments of the present invention will be described with reference to the drawings. Note that the embodiments described below are just examples, and embodiments to which the present invention is applied are not limited to the following embodiments.

(Properties of Video Quality)

An example of properties of the video quality assumed in the embodiment will be described before describing a method for estimating video quality according to the embodiment.

Figure 1:
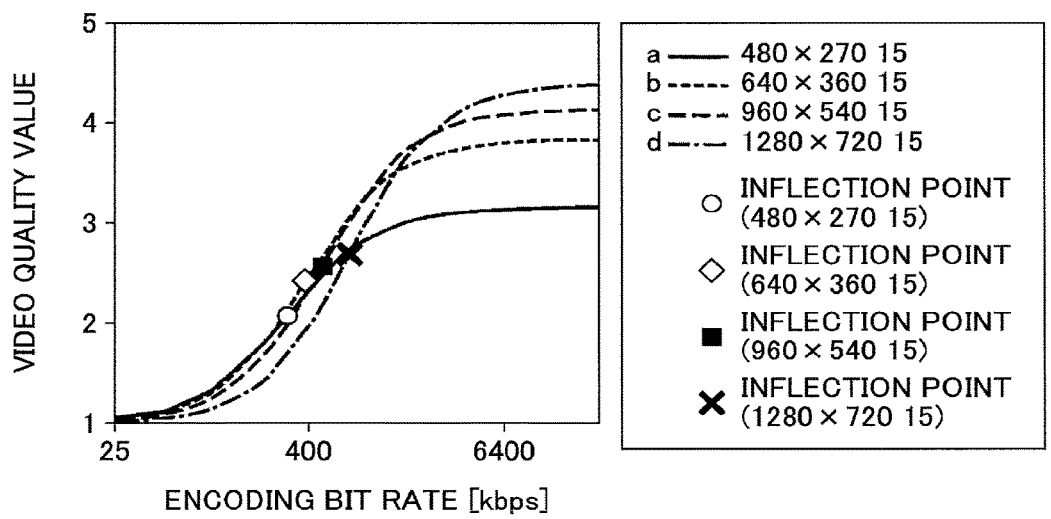
FIG. 1 illustrates a relationship between the encoding bit rate and the video quality value showing an example of a result of a subjective evaluation experiment (where the resolution is changed)
Figure 2:
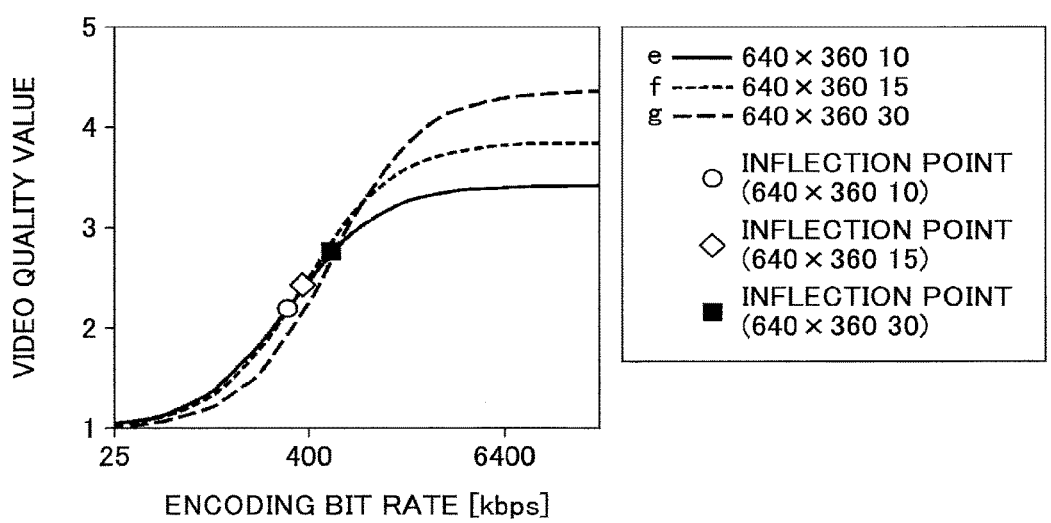
FIG. 2 illustrates a relationship between the encoding bit rate and the video quality value showing an example of a result of a subjective evaluation experiment (where the frame rate is changed)

FIG. 1 and FIG. 2 illustrate results of experiments in which multiple evaluators watch and evaluate a video (referred to as "subjective evaluation experiments", below). In FIG. 1 and FIG. 2, the vertical axis represents the average of grades given by the evaluators who evaluate the video that they have viewed and listened to (referred to as the "video quality value", below), and the horizontal axis represents the encoding bit rate.

Different plotted points in FIG. 1 and FIG. 2 represent different resolutions of the video in FIG. 1 and different frame rates in FIG. 2. In other words, FIG. 1 illustrates curves obtained in a state where the frame rate is fixed to 15 while the resolution is changed, namely, the curves a (resolution 480×270), b (resolution 640×360), c (resolution 960×540), and d (resolution 1280×720). Also, FIG. 2 illustrates curves obtained in a state where the resolution is fixed to 640×360 while the frame rate is changed, namely, the curves e (frame rate 10), f (frame rate 15), and g (frame rate 30).

In these subjective evaluation experiments in which either of the resolution or the frame rate is fixed, results are obtained as follows:

The encoding bit rate and the video quality value have a relationship represented by an S-curve (Property 1);

When the encoding bit rate becomes small, the video quality value converges on a minimum quality value (the video quality value 1 in FIG. 1 and FIG. 2) (Property 2);

When the encoding bit rate becomes great, the video quality value converges on a certain video quality value, which becomes greater while the encoding bit rate becomes greater or the frame rate becomes greater (Property 3); and In addition, a result is obtained about the inflection points of the S-curves plotted in FIG. 1 and FIG. 2 in which the inflection point is positioned at a higher encoding bit rate in FIG. 1 if the resolution is greater, and in FIG. 2 if the frame rate is greater (Property 4). As an example of properties of the video quality, Properties 1 to 4 are observed.

(Apparatus Configuration)

Figure 3:
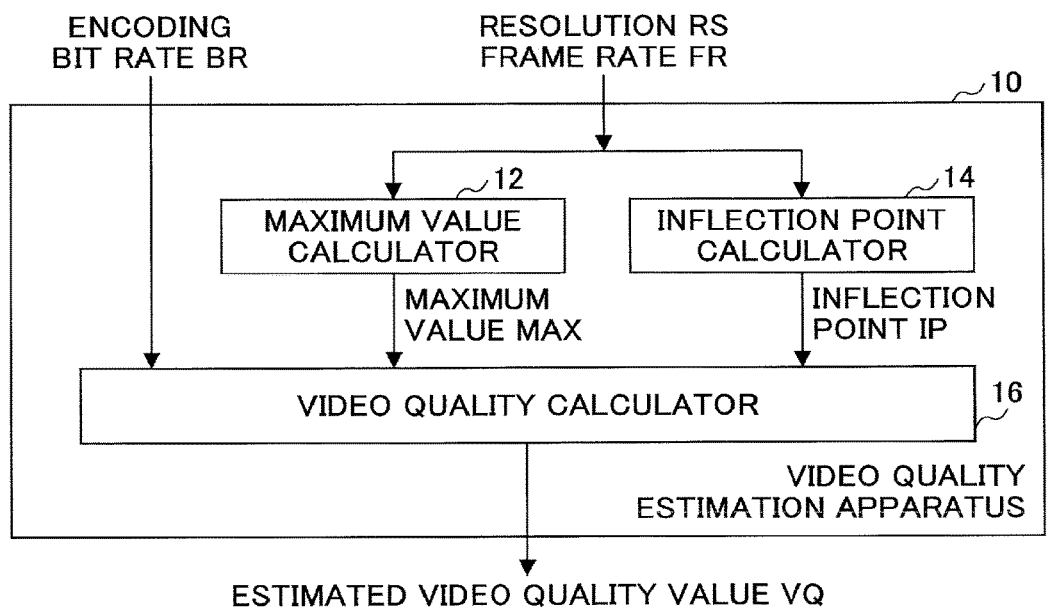
FIG. 3 is a functional block diagram illustrating an example of a configuration of a video quality estimation apparatus to which a method for estimating video quality according to an embodiment is applied.

FIG. 3 is a functional block diagram illustrating an example of a configuration of a video quality estimation apparatus 10 to which a method for estimating video quality according to the embodiment is applied.

In the embodiment, based on the video quality value being the average of grades obtained by the subjective evaluation experiments, the relationship among encoding bit rate BR, resolution RS, frame rate FR, and the video quality value is modeled, and by using a derived model formula, an estimated video quality value VQ is calculated from the encoding bit rate BR, the resolution RS, and the frame rate FR.

In order to implement this, the video quality estimation apparatus 10 includes a maximum value calculator 12, an inflection point calculator 14, and a video quality calculator 16. Such a video quality estimation apparatus 10 may be implemented by a computer that reads a program recorded on, for example, a recording medium such as a magnetic disc, or a program downloaded through a communication network such as the Internet, and the operation is controlled by the program. In other words, the maximum value calculator 12, the inflection point calculator 14, and the video quality calculator 16 are implemented by a processor of the computer that runs the program.

Alternatively, the maximum value calculator 12, the inflection point calculator 14, and the video quality calculator 16 may be implemented by hardware circuits, respectively.

The maximum value calculator 12 receives as input the resolution RS being the number of pixels in one frame of the video, and the frame rate FR being the number of frames per unit time of the video, and calculates a maximum value MAX of the video quality value that is determined for each resolution RS and each frame rate FR. The maximum value MAX of the video quality value is calculated by the following formula (Formula 1). Formula 1 is represented by a two-variable increasing function that increases while the resolution RS and the frame rate FR increase. As described above, when the encoding bit rate becomes great, the video quality value converges on a certain convergence value. A maximum value MAX here corresponds to the convergence value obtained with a resolution RS and a frame rate FR that are given.

$$\mathrm{MAX} = \frac{A_1 \cdot RS}{c_1 + RS} + VQ_{min} \qquad \text{Formula 1}$$

$$A_1 = (VQ_{max} - VQ_{min}) \cdot (1 - \exp(-c_2 \cdot FR))$$

where $c_1$ and $c_2$ are the coefficients, $VQ_{max}$ represents the maximum value that can be taken as the estimated video quality value VQ, and $VQ_{min}$ represents the minimum value that can be taken as the estimated video quality value VQ. For example, according to the ACR method, which is a subjective evaluation method defined in ITU-T recommendation P.910, $VQ_{max}$ is set to 5 and $VQ_{min}$ is set to 1.

Note that the maximum value calculator 12 may include processing logic corresponding to Formula 1 to calculate the maximum value MAX, or may read data of the function represented by Formula 1 from a storage unit included in the video quality estimation apparatus 10 to execute the calculation of Formula 1. Alternatively, according to the relationship represented by Formula 1, a table may be stored in the storage unit in which values of the resolution RS, the frame rate FR, and the maximum value MAX are associated with each other, from which a maximum value MAX is read out that corresponds to the input values, to execute the calculation.

Note that Formula 1 is just an example of a formula that calculates the maximum value MAX of the video quality value. Another formula may be used that appropriately represents the maximum value MAX of the video quality value obtained by the experiments or the like for each resolution RS and each frame rate FR.

The inflection point calculator 14 calculates an inflection point IP by using the resolution RS and the frame rate FR. The inflection point IP is a point at which the curving direction changes on a curve drawn by a sigmoid function used in the video quality calculator 16. The sigmoid function has the property of S-curve that the value converges on a certain value when the input value increases or decreases. The inflection point IP is calculated by the following formula (Formula 2). Formula 2 is represented by a two-variable increasing function that increases while the resolution RS and the frame rate FR increase.

$$IP = \frac{c_3 \cdot RS + A_2}{1 - e^{-c_6 \cdot RS}} \quad \text{Formula 2}$$

$$A_2 = c_4 \cdot \log_e(c_5 \cdot FR + 1)$$

where $c_3$, $c_4$, $c_5$, and $c_6$ are the coefficients. Note that the unit of the inflection point IP is the same as the unit of the encoding bit rate.

Note that the inflection point calculator 14 may include processing logic corresponding to Formula 2 to calculate the inflection point IP, or may read data of the function represented by Formula 2 from a storage unit included in the video quality estimation apparatus 10 to execute the calculation of Formula 1. Alternatively, according to the relationship represented by Formula 2, a table may be stored in the storage unit in which values of the resolution RS, the frame rate FR, and the inflection point IP are associated with each other, from which an inflection point IP is read out that corresponds to the input values, to execute the calculation.

Note that Formula 2 is just an example of a formula that calculates the inflection point IP. Another formula may be used that appropriately represents the inflection point IP obtained by the experiments or the like for each resolution RS and each frame rate FR.

The video quality calculator 16 receives the encoding bit rate BR as the input value, and calculates the estimated video quality value VQ represented by the sigmoid function to which a maximum value MAX of the video quality value and an inflection point IP are applied. An example of such a sigmoid function is illustrated by the following Formula 3.

$$VQ = MAX + \frac{VQ_{min} - MAX}{1 + \left(\frac{BR}{IP}\right)^{c_7}} \quad \text{Formula 3}$$

where $c_7$ appearing as the exponent of (BR/IP) is the coefficient. As such, the estimated video quality value VQ is represented by the sigmoid function taking the encoding bit rate BR as input. The coefficient $c_7$ is determined so that the higher convergence value of the encoding bit rate BR becomes the maximum value MAX of the video quality value, and the lower convergence value of the encoding bit rate BR becomes the minimum value MIN of the video quality value. Also, the inflection point IP corresponds to the X-axis coordinate of the inflection point of the sigmoid function.

Note that $c_1$, $c_2$, $c_3$, $c_4$, $c_5$, $c_6$, and $c_7$ may be determined by the method of least squares or the like so as to be optimized in a sense that the difference becomes minimum between the video quality value and the estimated video quality value VQ obtained by the subjective evaluation experiments.

Note that the video quality calculator 16 may include processing logic corresponding to Formula 3 to calculate the estimated video quality value VQ, or may read data of the function represented by Formula 3 from a storage unit included in the video quality estimation apparatus 10 to execute the calculation of Formula 3. Alternatively, according to the relationship represented by Formula 3, a table may be stored in the storage unit in which values of the maximum value MAX, the inflection point IP, the encoding bit rate BR, and the estimated video quality value VQ are associated with each other, from which an estimated video quality value VQ is read out that corresponds to the input values (the maximum value MAX, the inflection point IP, and the encoding bit rate BR), to execute the calculation.

Also, a formula that calculates the estimated video quality value VQ from the maximum value MAX of the video quality value, the inflection point IP, and the encoding bit rate BR is not limited to Formula 3, but another formula may be used that draws an S-curve having the inflection point IP as an inflection point (not limited to a sigmoid function).

Since the maximum value MAX and the inflection point IP are each obtained from the resolution RS and the frame rate FR, Formula 3 is an example of a formula that calculates the estimated video quality value VQ from the resolution RS, the frame rate FR, and the encoding bit rate BR.

Figure 4:
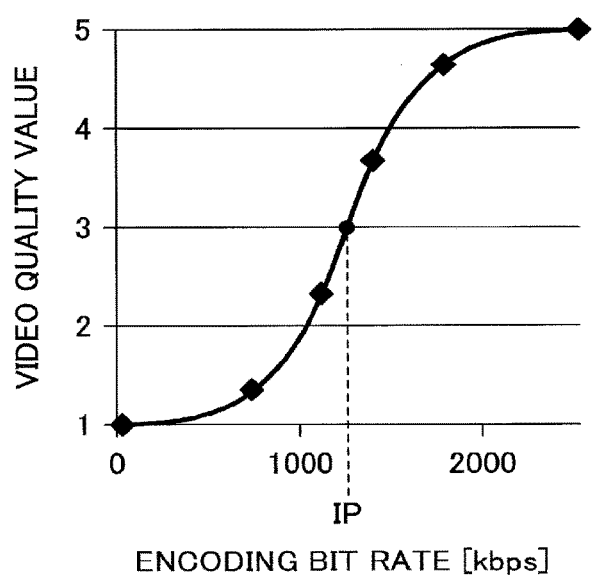
FIG. 4 is a diagram illustrating a relationship between the encoding bit rate and the video quality value, based on a formula for estimating video quality according to an embodiment.

FIG. 4 schematically illustrates a graph representing the video quality value obtained by Formula 3 for each encoding bit rate BR, given certain resolution RS and frame rate FR. In FIG. 4, the value of the inflection point IP for the given resolution RS and frame rate FR is illustrated as "IP". Also, in the case of FIG. 4, the maximum value MAX for the given resolution RS and frame rate FR is 5.

In the embodiment, a formula that calculates the estimated video quality value VQ from the resolution RS, the frame rate FR, and the encoding bit rate BR is not limited to that having the inflection point as illustrated in Formula 3 and FIG. 4, but the following Formula 4 may be used, for example.

$$VQ = MAX - MAX \cdot \exp(-BR/a) \quad \text{Formula 4}$$

where "a" is a fixed coefficient whose suitable value is determined by, for example, an experiment or the like. MAX is the maximum value MAX that has been already described, which is calculated by Formula 1 in the embodiment. BR is the encoding bit rate.

Figure 5:
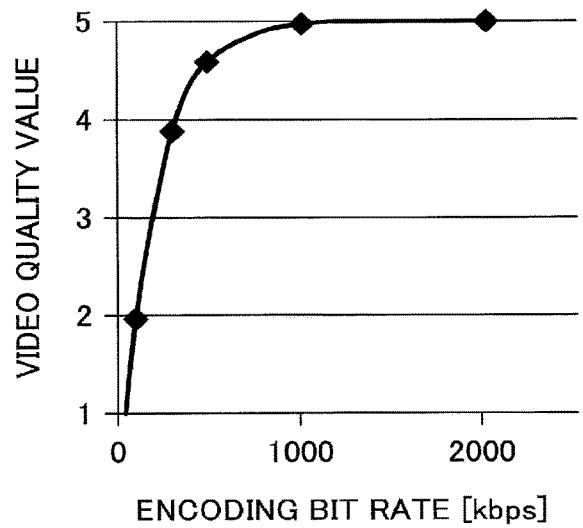
FIG. 5 is a diagram illustrating a relationship between the encoding bit rate and the video quality value, based on a formula for estimating video quality according to an embodiment.

FIG. 5 schematically illustrates a graph representing the video quality value obtained by Formula 4 for each encoding bit rate BR, given certain resolution RS and frame rate FR. As illustrated in FIG. 5, the graph does not have an inflection point, and the video quality value decreases from the maximum value MAX (5 in the case of FIG. 5) while the encoding bit rate decreases.

In this case, the video quality calculator 16 may include processing logic corresponding to Formula 4 to calculate the estimated video quality value VQ, or may read data of the function represented by Formula 4 from a storage unit included in the video quality estimation apparatus 10 to execute the calculation of Formula 4. Alternatively, according to the relationship represented by Formula 4, a table may be stored in the storage unit in which values of the maximum value MAX, the encoding bit rate BR, and the estimated video quality value VQ are associated with each other, from which an estimated video quality value VQ is read out that corresponds to the input values (the maximum value MAX and the encoding bit rate BR), to execute the calculation.

Note that although it has been described with FIG. 1 and FIG. 2 that having the inflection point is one of the properties of the video quality, this is just an example of the properties of the video quality. Depending on the video, as illustrated in FIG. 5, the video quality value may increase while the encoding bit rate increases, and may converge on the maximum value MAX without having an inflection point. For such a video, a formula that does not have an inflection point such as Formula 4 can be used to precisely estimate the video quality. Also, if using Formula 4, the video quality estimation apparatus 10 may not include the inflection point calculator 14.

Although the method for obtaining or determining the resolution, the frame rate, and the encoding bit rate used as input values to the video quality estimation apparatus 10 in the embodiment is not limited to a specific method, the following method may be considered as an example.

For example, if a provider of the video distribution service estimates the video quality by using the video quality estimation apparatus 10, the provider can use the resolution, the frame rate, and the encoding bit rate that are used for the video distribution service as the input values.

Also, for example, if a user of a network business company or the video distribution service, who does not know the resolution, the frame rate, and the encoding bit rate that are used in the video distribution service, estimates the video quality of the video distribution service by using the video quality estimation apparatus 10, the user may obtain meta-information (e.g., MPD (Media Presentation Description) in MPEG-DASH) distributed from the server so as to obtain the resolution, the frame rate, and the encoding bit rate described in the meta-information, and to use them as the input values to the video quality estimation apparatus 10.

Note that the encoding bit rate described in the meta-information is a target bit rate (a set value to be achieved during the encoding). In a case where the actual encoding bit rate fluctuates considerably with respect to the target bit rate, it is desirable to measure the actual encoding bit rate to be used as the input value. This is because the measured encoding bit rate corresponds better with the video quality than the target bit rate. Therefore, as for the encoding bit rate, it is desirable to use, as the input value, a bit rate that has been obtained by measuring the payload of IP packets of the video transmitted by the video distribution service.

Here, if video and sound media are encrypted, and hence, each of the media cannot be identified but only the total bit rate can be measured, the sound bit rate may be obtained from the meta-information, which is then subtracted from the total bit rate measured with the IP packets, to treat the subtracted value as the encoding bit rate of the video. Note that since the sound bit rate hardly fluctuates with respect to the target bit rate, the value obtained from the meta-information as described above can be used.

Also, if the bit stream of the IP packets (the very data encoded by H.264 or H.265) can be accessed, measuring the bit rate of the data makes it possible to use the measured bit rate as the input value to the video quality estimation apparatus 10.

The functionality of obtaining the resolution, the frame rate, and the encoding bit rate may be provided with the video quality estimation apparatus 10 as described above, or another device may provide the functionality, and inputs the value obtained on the device into the video quality estimation apparatus 10.

(Operational Steps)

Figure 6:
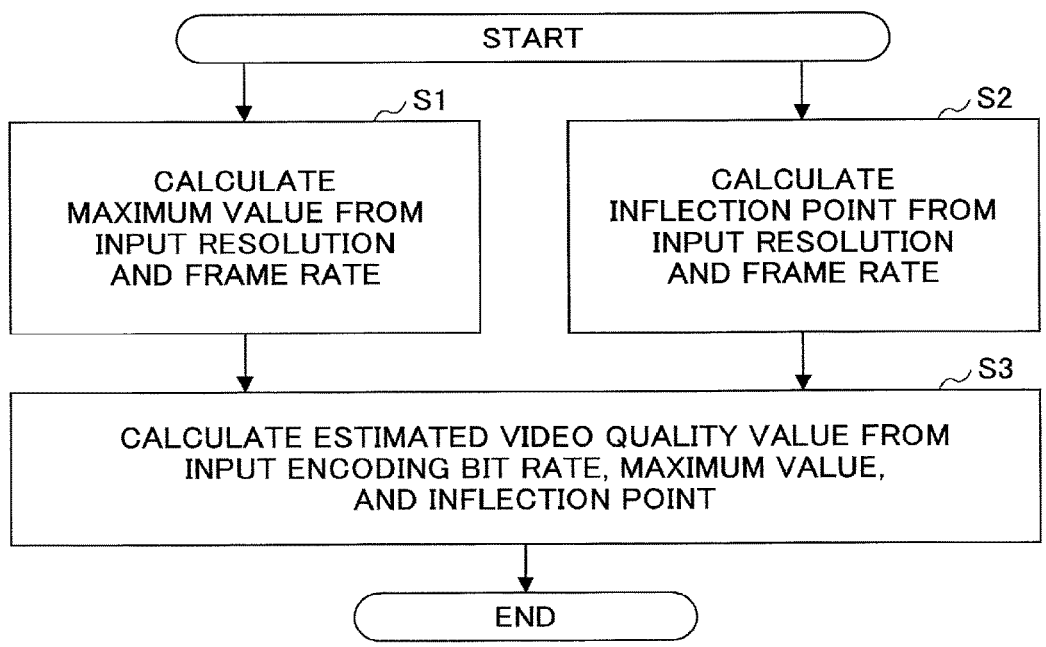
FIG. 6 is a flowchart illustrating an example of operations of a video quality estimation apparatus to which a method for estimating video quality according to an embodiment is applied.

Next, operations of the video quality estimation apparatus 10 configured as described above, to which the method for estimating video quality according to the embodiment is applied, will be described using a flowchart in FIG. 6. In the following, a case will be described as an example in which a formula having the inflection point IP (e.g., Formula 3) is used for estimating the video quality. Note that if using a formula not having an inflection point IP as Formula 4, it is not necessary to calculate the inflection point IP at Step S2 below.

First, the maximum value calculator 12 calculates the maximum value MAX of the video quality value that is determined for each resolution RS and for each frame rate FR where the resolution RS is the number of pixels in one frame of the video, and the frame rate FR is the number of frames per unit time in the video (Step S1). The maximum value MAX of the video quality value is, as described above, represented by a two-variable increasing function that increases while the resolution RS and the frame rate FR increase. At Step S1, the maximum value calculator 12 calculates the maximum value MAX by inputting certain resolution RS and frame rate FR into the two-variable increasing function.

In addition, by using the resolution RS and the frame rate FR, the inflection point calculator 14 calculates the inflection point IP, which is a point where the curving direction changes on a curve drawn by the sigmoid function used in the video quality calculator 16 (Step S2). The sigmoid function has the property of an S-curve that converges on a certain value when the input value increases or decreases. The inflection point IP is, as described above, represented by a two-variable increasing function that increases while the resolution RS and the frame rate FR increase. In other words, at Step S2, the inflection point calculator 14 calculates the inflection point IP by inputting the resolution RS and the frame rate FR, which are used as the input at Step S1, into the two-variable increasing function.

Next, the video quality calculator 16 takes the encoding bit rate BR as the input value, and calculates the estimated video quality value VQ represented by the sigmoid function to which the maximum value MAX of the video quality value calculated at Step S1, and the inflection point IP calculated at Step S2 are applied (Step S3). In other words, the video quality calculator 16 inputs a certain encoding bit rate BR, the maximum value MAX calculated at Step S1, and the inflection point IP calculated at Step S2 into the sigmoid function (e.g., Formula 3) whose variables are the encoding bit rate BR, the maximum value MAX, and the inflection point IP, to calculate the estimated video quality value VQ.

The coefficient $c_7$ is determined so that the higher convergence value of the encoding bit rate BR becomes the maximum value MAX of the video quality value, and the lower convergence value of the encoding bit rate BR becomes the minimum value MIN of the video quality value. Also, the inflection point IP corresponds to the X-axis coordinate of the inflection point of the sigmoid function.

Note that $c_1$, $c_2$, $c_3$, $c_4$, $c_5$, $c_6$, and $c_7$ may be determined by the method of least squares or the like so as to be optimized in a sense that the difference becomes minimum between the video quality value and the estimated video quality value VQ obtained by the subjective evaluation experiments.

Note that Step S1 and Step S2 may be executed by either of serial processing or parallel processing. Also, in the case of serial processing, whichever of Step S1 and Step S2 can be executed first.

(Summary of Embodiment)

As has been described so far, in a service of encoded video to be viewed and listened to, the video quality estimation apparatus 10 of the embodiment estimates the video quality value which is a value quantifying the video quality felt by the user viewing and listening to the encoded video.

On this account, the video quality estimation apparatus 10 calculates the video quality value that is determined by the resolution being the number of pixels in one frame of the video and the frame rate being the number of frames per unit time of the video. Also, the video quality estimation apparatus 10 calculates an inflection point being a point at which the curving direction changes on a curve drawn by a sigmoid function having a property of an S-curve that converges on a certain value when the input value increases or decreases, based on the resolution and the frame rate. Then, the video quality estimation apparatus 10 takes an encoding bit rate being the average amount of data per unit time of the video as the input value, and calculates the estimated video quality value represented by the sigmoid function to which the calculated maximum value and the calculated inflection point are applied.

Note that the coefficient of the sigmoid function is determined so that the higher convergence value of the sigmoid function becomes the maximum value of the video quality value, and the lower convergence value of the sigmoid function becomes the minimum value of the video quality value. Also, the maximum value of the video quality value is represented by a two-variable increasing function that increases while the resolution and the frame rate increase, and the inflection point is represented by a two-variable increasing function that increases while the resolution and the frame rate increase.

Also, the maximum value calculator may be configured to include a maximum value calculator configured to calculate a maximum value of the video quality value from a resolution of the video and a frame rate of the video; and a video quality calculator configured to calculate an estimated video quality value corresponding to an encoding bit rate having been input, based on a predetermined relationship between the encoding bit rate of the video and the video quality value, wherein the predetermined relationship is a relationship in which the video quality value increases while the encoding bit rate increases, and the video quality value converges on the maximum value calculated by the maximum value calculator.

As described above, in the video quality estimation apparatus 10 to which the method for estimating video quality according to the embodiment is applied, a model for estimating the video quality value is built by using a sigmoid function.

Since a sigmoid function can be represented by an S-curve that converges on a certain value while the input value increases or decreases, Property 1 described above can be taken into account. Also, since the convergence value of a sigmoid function can be determined by the coefficient, by determining the coefficient so that the higher convergence value of the sigmoid function becomes the maximum value of the video quality value, and the lower convergence value of the sigmoid function becomes the minimum value of the video quality value, Property 2 and Property 3 described above can be also taken into account.

Furthermore, since the X-axis coordinate of the inflection point on the S-curve of a sigmoid function can be determined by the coefficient, by modelling the coefficient so that the X-axis coordinate of the inflection point IP determined by the coefficient increases while the resolution RS and the frame rate FR increase, Property 4 described above can be also taken into account.

Therefore, by building a model for estimating the video quality value by using a sigmoid function as in the video quality estimation apparatus 10 to which the method for estimating video quality according to embodiment is applied, it is possible to calculate the estimated video quality value VQ by considering the resolution RS and the frame rate FR in addition to the encoding bit rate BR.

Furthermore, estimating the estimated video quality value VQ by using such an apparatus, a method, and a program makes it possible not only to grasp quantitatively the quality of the video distribution service of a servicing company and other competing companies, but also to utilize these results for marketing and service improvement.

Also, by utilizing the result of the estimated video quality value VQ, and designing and controlling the distribution parameters to maximize the video quality value, it is possible to raise the video quality. As further consequences, improvement in the customer satisfaction and contribution to raising the revenue of the video distribution service can be also expected.

As has been described above so far, the model taking Properties 1 to 4 into account is built by using the sigmoid function in the embodiment. Since the sigmoid function can be represented by an S-curve that converges on a certain value while the input value increases or decreases, Property 1 can be modeled. Also, since the convergence value of the sigmoid function can be determined by the coefficient, by determining the coefficient so that the higher convergence value of the sigmoid function becomes the maximum value of the video quality value, and the lower convergence value of the sigmoid function becomes the minimum value of the video quality value, Property 2 and Property 3 can be taken into account.

Furthermore, since the X-axis coordinate of the inflection point on the S-curve of the sigmoid function can be determined by the coefficient, by modelling the coefficient so that the X-axis coordinate of the inflection point IP determined by the coefficient increases while the resolution RS and the frame rate FR increase, Property 4 can be also taken into account.

Therefore, by using the model using the sigmoid function, the apparatus, the method, and the program capable of precisely estimating the video quality value can be realized while considering the resolution and the frame rate in addition to the encoding bit rate.

Note that a function representing an S-curve whose output value converges on a certain value when the input value increases or decreases is not limited to the sigmoid function. A function other than the sigmoid function may be used as a function representing such an S-curve. Also, a function not having an inflection point as Formula 4 may be used. By using such a function not having an inflection point, the apparatus, the method, and the program capable of precisely estimating the video quality value can be realized while considering the resolution and the frame rate in addition to the encoding bit rate.

This invention is not limited to the embodiments, but can be modified to be used in various ways within the scope of this invention.

In other words, this invention is not limited to the embodiments as they are, but in actual applications, can be realized with modifying the elements within the scope of this invention. Also, by combining multiple elements disclosed in the embodiments, various inventions can be formed. For example, some elements may be deleted among all of the elements in an embodiment. Furthermore, elements in different embodiments may be combined appropriately.

The present patent application claims priority based on Japanese Patent Application No. 2014-232691, filed on Nov. 17, 2014, and the entire contents of Japanese Patent Application No. 2014-232691 are incorporated herein by reference.

LIST OF REFERENCE SYMBOLS 10 video quality estimation apparatus
12 maximum value calculator
14 inflection point calculator
16 video quality calculator

The invention claimed is:

1. A video quality estimation apparatus used for an encoded video to be viewed and listened to, to estimate a video quality value being a value quantifying a video quality being quality of the video felt by a user when viewing and listening to the video, the video quality estimation apparatus comprising:
a maximum value calculator configured to calculate a maximum value of the video quality value from a resolution of the video and a frame rate of the video; and
a video quality calculator configured to calculate an estimated video quality value corresponding to an encoding bit rate having been input, based on a predetermined relationship between the encoding bit rate of the video and the video quality value,
wherein the predetermined relationship is a relationship in which the video quality value increases while the encoding bit rate increases, and the video quality value converges on the maximum value calculated by the maximum value calculator.

2. A non-transitory computer readable medium including a video quality estimation program executed by a computer used as the video quality estimation apparatus according to claim 1 to execute processes of the calculators included in the video quality estimation apparatus.

3. A video quality estimation apparatus used for an encoded video to be viewed and listened to, to estimate a video quality value being a value quantifying a video quality being quality of the video felt by a user when viewing and listening to the video, the video quality estimation apparatus comprising:
a maximum value calculator configured to calculate a maximum value of the video quality value, based on a resolution being a number of pixels in one frame of the video and a frame rate being a number of frames per unit time of the video,
an inflection point calculator configured to calculate an inflection point being a point at which a curving direction changes on a curve drawn by a sigmoid function having a property of an S-curve that converges on a certain value when an input value increases or decreases, based on the resolution and the frame rate, and
a video quality calculator configured to calculate an estimated video quality value by inputting an encoding bit rate being an average amount of data per unit time of the video, the maximum value of the video quality value calculated by the maximum value calculator, and the inflection point calculated by the inflection point calculator, into the sigmoid function.

4. The video quality estimation apparatus according to claim 3, wherein a coefficient of the sigmoid function is determined so that a higher convergence value of the sigmoid function becomes the maximum value of the video quality value, and a lower convergence value of the sigmoid function becomes a minimum value of the video quality value.

5. The video quality estimation apparatus according to claim 3, wherein the maximum value of the video quality value is represented by a two-variable increasing function that increases while the resolution and the frame rate increase, and the inflection point is represented by a two-variable increasing function that increases while the resolution and the frame rate increase.

6. A method for estimating video quality executed by a video quality estimation apparatus used for an encoded video to be viewed and listened to, to estimate a video quality value being a value quantifying a video quality being quality of the video felt by a user when viewing and listening to the video, the method comprising:
a maximum value calculating step for calculating a maximum value of the video quality value from a resolution of the video and a frame rate of the video, and
a video quality calculating step for calculating an estimated video quality value corresponding to an encoding bit rate having been input, based on a predetermined relationship between the encoding bit rate of the video and the video quality value,
wherein the predetermined relationship is a relationship in which the video quality value increases while the encoding bit rate increases, and the video quality value converges on the maximum value calculated by the maximum value calculating step.

7. A method for estimating video quality executed by a video quality estimation apparatus used for an encoded video to be viewed and listened to, to estimate a video quality value being a value quantifying a video quality being quality of the video felt by a user when viewing and listening to the video, the method comprising:
calculating a maximum value of the video quality value, based on a resolution being a number of pixels in one frame of the video and a frame rate being a number of frames per unit time of the video, calculating an inflection point being a point at which a curving direction changes on a curve drawn by a sigmoid function having a property of an S-curve that converges on a certain value when an input value increases or decreases, based on the resolution and the frame rate, and calculating an estimated video quality value by inputting an encoding bit rate being an average amount of data per unit time of the video, the maximum value, and the inflection point, into the sigmoid function.

8. The method for estimating the video quality according to claim 7, wherein a coefficient of the sigmoid function is determined so that a higher convergence value of the sigmoid function becomes the maximum value of the video quality value, and a lower convergence value of the sigmoid function becomes a minimum value of the video quality value.

9. The method for estimating the video quality according to claim 7, wherein the maximum value of the video quality value is represented by a two-variable increasing function that increases while the resolution and the frame rate increase, and the inflection point is represented by a two-variable increasing function that increases while the resolution and the frame rate increase.

* * * * *